United States Patent Office.

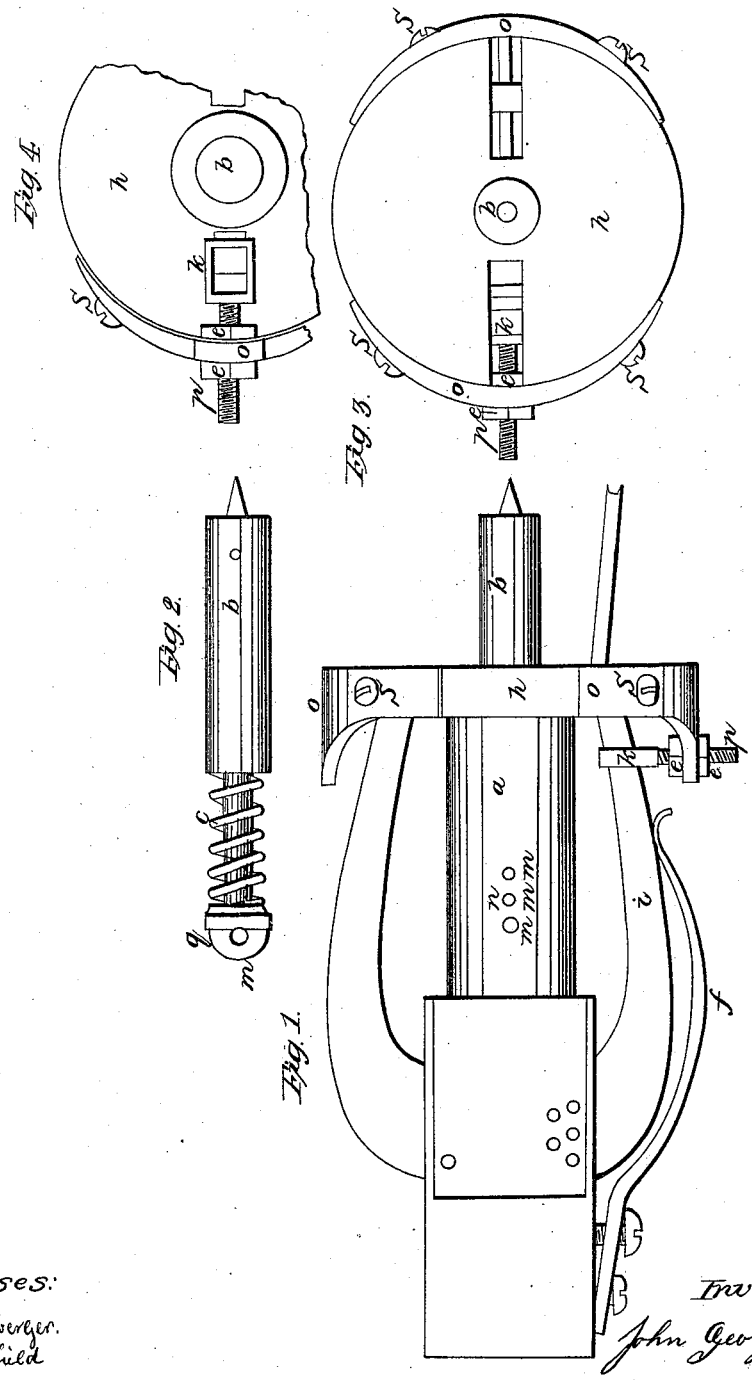

JOHN G. SCHMIDT, OF ROCHESTER, NEW YORK.

Letters Patent No. 64,581, dated May 7, 1867.

---

IMPROVEMENT IN MACHINES FOR CUTTING BUNGS.

---

The Schedule referred to in these Letters Patent and making part of the same.

---

TO ALL WHOM IT MAY CONCERN:

Be it known that I, JOHN GEORGE SCHMIDT, of Rochester, county of Monroe, and State of New York, have invented new and useful improvements on my Machine for Cutting Bungs for barrels, for which machine I received Letters Patent, which bear date December 11, 1866, No. 60,430; and I do hereby declare that the following is a full and exact description thereof, reference being had to the accompanying drawings and to the letters of reference marked thereon, in which—

Figure 1 represents a front view of my machine.
Figure 2 represents a longitudinal view of yielding centre $b$.
Figure 3 represents the circular plate $h$, under side.
Figure 4 represents the upper side of circular plate $h$.

The nature of my invention consists in using but one spring $f$, instead of two, as claimed in my Letters Patent bearing date the 11th day of December, 1866, No. 60,430, for holding the knife $i$; also in discarding the screws $g\ g$, and substituting therefor the safety-plates $o\ o$, and gauge $k$, and in making holes through the mandrel, as shown at $m\ m\ m$, in fig. 1, and through the head of yielding centre, as shown at $q$, in fig. 2.

To enable others skilled in the art to make and use my invention, I will proceed to describe its construction and operation.

I construct my safety-plates $o\ o$ of steel, which are fitted close to the outside edge of circular plate $h$, and made fast to the same by means of screws $s\ s\ s\ s$, as seen in figs. 1 and 3. The gauge $k$ is also made of steel, with a square frame to admit the knife and guide the same when the machine is worked. The opening inside of gauge or frame $k$ is large enough to allow the knife the necessary room to move to and from the yielding centre $b$. On one end of the square frame $k$ is a screw cut, $p$. Said screw $p$ passes through a hole in guide-plate $o$, with nuts on either side of guide-plate $o$, as seen in figs. 1 and 4. The gauge $k$, with square frame, screw $p$, and the two nuts $e\ e$, are for the purpose of regulating the size of the bung to be cut, and to prevent the knife $i$ from moving too far away from the centre $b$. I also improve the yielding centre $b$ of my machine by arranging the same in such a manner that it may be raised or lowered by shifting the pin $n$ to either of the holes $m\ m\ m$, so as to suit the length of the knife or the thickness of the wood.

What I claim as my invention, and desire to secure by Letters Patent, is—

1. I claim the safety-plates $o\ o$, in connection with gauge $k$, screw $p$, and nuts $e\ e$, all for the purpose and in the manner herein described.

2. I claim the head $q$, of yielding centre $b$, with hole $m$, the holes $m\ m\ m$ in mandrel $a$, and the pin $n$, all for the purpose and in the manner herein described.

JOHN GEORGE SCHMIDT.

Witnesses:
GEORGE TRAUENBERGER,
THOMAS DRANSFIELD.